(12) United States Patent
Lashkari et al.

(10) Patent No.: US 8,971,833 B2
(45) Date of Patent: Mar. 3, 2015

(54) ELECTRONIC DEVICE WITH DYNAMIC DRIVE STRENGTH ADJUSTMENT TO MITIGATE IMPACT OF SYSTEM NOISE ON WIRELESS PERFORMANCE

(75) Inventors: Hassan Lashkari, Palo Alto, CA (US); Gary Thomason, Boulder Creek, CA (US); Jaime Tolentino, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1162 days.

(21) Appl. No.: 12/892,562

(22) Filed: Sep. 28, 2010

(65) Prior Publication Data

US 2012/0074988 A1 Mar. 29, 2012

(51) Int. Cl.
*H04B 1/10* (2006.01)
*H04L 25/02* (2006.01)
*H04B 1/38* (2006.01)
*H01Q 11/12* (2006.01)
*H04B 1/04* (2006.01)
*H04M 1/00* (2006.01)

(52) U.S. Cl.
CPC .................................. *H04L 25/0264* (2013.01)
USPC ..... 455/296; 455/90.3; 455/127.1; 455/575.1

(58) Field of Classification Search
USPC .............. 327/108, 109; 455/90.3, 127.1, 296, 455/298, 575.1
See application file for complete search history.

(56) References Cited

U.S. PATENT DOCUMENTS

| | | | |
|---|---|---|---|
| 5,548,502 A | 8/1996 | Kosugi | |
| 5,914,553 A | 6/1999 | Adams et al. | |
| 6,838,944 B2 | 1/2005 | Franca-Neto | |
| 7,248,120 B2 | 7/2007 | Burgener et al. | |
| 7,340,228 B2 | 3/2008 | Monroe et al. | |
| 7,443,977 B1 | 10/2008 | Toumani et al. | |
| 2003/0001519 A1* | 1/2003 | Kirkpatrick et al. | 315/248 |
| 2004/0022537 A1* | 2/2004 | Mecherle et al. | 398/41 |
| 2006/0139326 A1* | 6/2006 | Tsukamoto | 345/158 |
| 2006/0202713 A1* | 9/2006 | Shumarayev | 326/38 |
| 2007/0021087 A1* | 1/2007 | Turner | 455/298 |
| 2008/0088365 A1* | 4/2008 | Jang | 327/563 |
| 2009/0075607 A1* | 3/2009 | Khoury | 455/127.1 |
| 2009/0138745 A1* | 5/2009 | Dorsey et al. | 713/501 |
| 2010/0208848 A1* | 8/2010 | Zhu et al. | 375/340 |

OTHER PUBLICATIONS

Dorsey, U.S. Appl. No. 12/752,058, filed Mar. 31, 2010.

* cited by examiner

*Primary Examiner* — Yuwen Pan
*Assistant Examiner* — Ayodeji Ayotunde
(74) *Attorney, Agent, or Firm* — Treyz Law Group; G. Victor Treyz; Michael H. Lyons

(57) ABSTRACT

Electronic devices such as portable computers may contain circuits that generate radio-frequency noise. The radio-frequency noise may interfere with the operation of sensitive circuitry such as wireless communications circuitry. The circuits that generate the radio-frequency noise may include differential signal drivers that drive signals onto communications lines such as lines in a bus or output interface. A control circuit may power the drivers at an adjustable driver voltage bias level. The amount of noise that is generated by the drivers may vary as a function of the voltage bias level and may produce different amounts of noise at different wireless frequencies. Computer lid position and other factors may also influence the amount of interference that is generated. The control circuit may determine the current operating state of the device and may make voltage bias level adjustments that minimize interference between the drivers and the wireless circuitry.

20 Claims, 8 Drawing Sheets

| LID POSITION | CHANNEL | DRIVE STRENGTH (Vpp) | NOISE (a.u.) |
|---|---|---|---|
| ⋮ | | | |
| OPEN | 11 | 0.8V | 13.2 |
| CLOSED | 11 | 0.8 | 14.4 |
| OPEN | 11 | 0.9 | 8.0 |
| CLOSED | 11 | 0.9 | 9.7 |
| OPEN | 11 | 1.0 | 16.9 |
| CLOSED | 11 | 1.0 | 16.2 |
| ⋮ | | | |

FIG. 10

ELECTRONIC DEVICE WITH DYNAMIC DRIVE STRENGTH ADJUSTMENT TO MITIGATE IMPACT OF SYSTEM NOISE ON WIRELESS PERFORMANCE

BACKGROUND

This relates to mitigating interference in electronic devices such as wireless electronic devices.

Electronic devices such as computers are subject to platform noise. Internal system circuitry, such as circuitry associated with memory systems, hard drive and optical drive systems, and graphics systems can produce signals with frequencies that interfere with the operation of other circuits. These interference signals may, for example, have radio-frequency (RF) components that fall within the bands associated with wireless transceiver circuitry such as Bluetooth® or wireless local area network (WLAN) circuitry in a wireless electronic device.

The presence of interference from RF noise detrimentally affects device performance. From a user perspective, interference can result in elevated packet error rates, decreased wireless range, and reduced data rates.

The severity of platform noise may vary based on a number of factors, such as operating band (2.4 GHz or 5 GHz), antenna system type, and electronic device geometry.

Noise generated by traffic on a digital bus such as Peripheral Component Interconnect Express (PCIe) traffic on a PCIe bus can be particularly problematic for wireless communications such as wireless local area network and Bluetooth® communications, because PCIe traffic can affect both the 2.4 GHz and 5 GHz communications bands. Interference can become more pronounced in devices such as portable computers when the lids of the portable computers are closed. This is because closing the lid of the portable computer can cause an antenna in the lid to move closer to PCIe noise sources. The increase in interference that results from closing the lid of a portable computer is particularly undesirable for users who want to operate their computers in a closed configuration while using an external display.

It would therefore be desirable to be able to mitigate the impact of radio-frequency interference in electronic devices.

SUMMARY

Electronic devices such as portable computers may contain circuits that generate radio-frequency noise. The radio-frequency noise may interfere with the operation of sensitive circuitry such as wireless communications circuitry.

The circuits that generate the radio-frequency noise typically include circuits such as differential signal drivers that drive signals onto communications lines. The communications lines may be associated with a communications path in an output interface or lines in a bus. The bus may be, for example, a Peripheral Component Interconnect Express bus.

The noise that is generated when operating a differential signal driver has component at multiple frequencies each of which varies as a function of driver voltage bias level. In an electronic device such as a portable computer with a lid, the position of the lid may also affect how much radio-frequency noise couples into an antenna or other wireless circuitry. For example, more interference may be produced when the lid is closed than when the lid is open, particularly in computers in which the antenna is mounted in the lid and the interfering bus circuitry is mounted in a base unit to which the lid is connected.

During device characterization operations, interference effects may be monitored while varying the operating state of the device. Operating parameters that may be varied include driver bias voltage level, which components are active or inactive, which wireless band and channel is active, lid position, etc. Bit error rate measurements and other metrics may be used to determine how much each wireless channel is affected by the interference. Based on these characterizing measurements, optimum device settings may be identified.

During operation of the electronic device, control circuitry in the device may monitor the current operating state of the device. Sensor measurements and software-based measurements may be used to gather information on lid position, current wireless band, current wireless channel, which components are active and inactive, etc. Based on the current state of the device and based on preloaded optimum settings, the control circuitry may make real time adjustments to driver bias voltage levels and other operating parameters to ensure that interference with the current wireless channel is minimized.

Further features of the invention, its nature and various advantages will be more apparent from the accompanying drawings and the following detailed description of the preferred embodiments.

BRIEF DESCRIPTION OF THE DRAWINGS

FIG. 10 is a table showing how the amount of radio-frequency noise that is produced by drivers such as drivers that are driving data signals onto a bus during operation of an electronic device may vary depending on the operating state of the electronic device so that driver-induced noise may be dynamically reduced by selection of optimum operating settings for the electronic device in accordance with an embodiment of the present invention.

DETAILED DESCRIPTION

Figure 1:
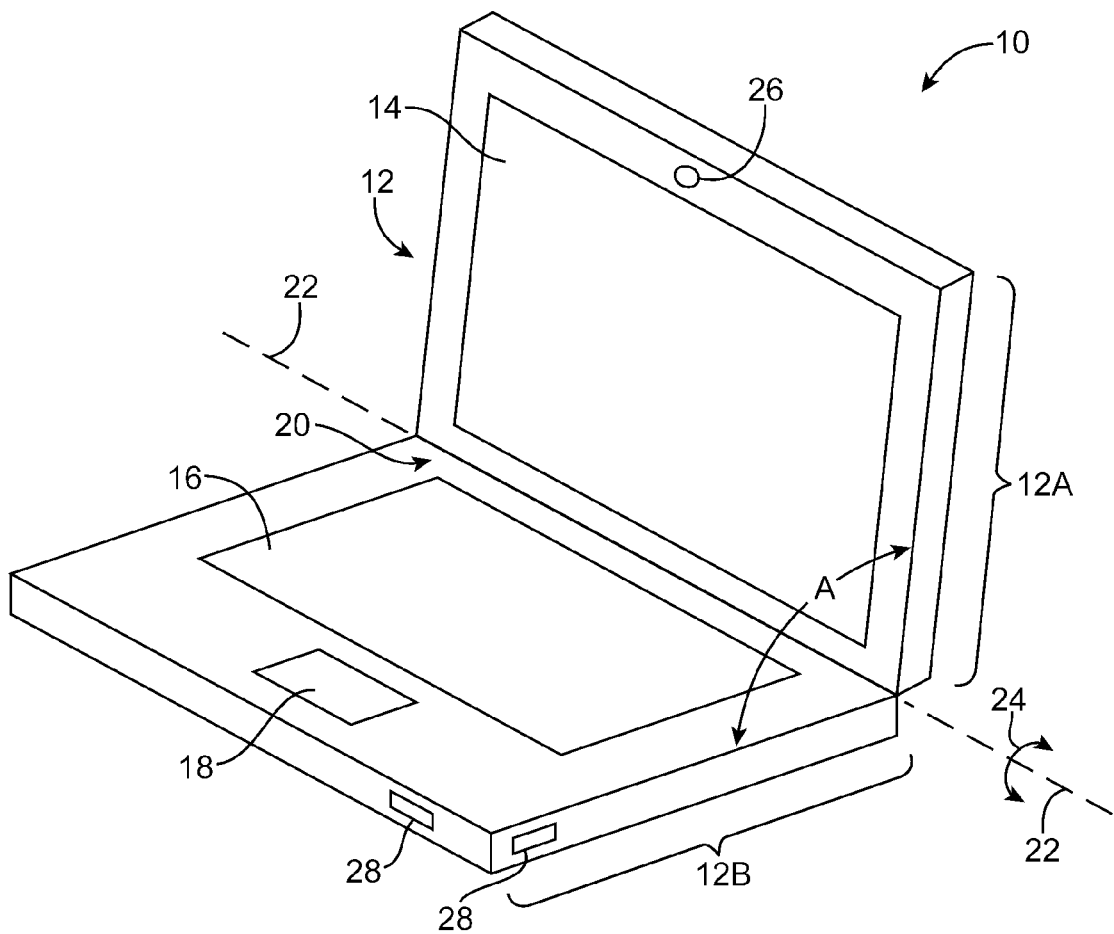
FIG. 1 is a perspective view of an illustrative electronic device in accordance with an embodiment of the present invention.

An electronic device such as electronic device 10 of FIG. 1 may contain circuitry that is sensitive to interference. For example, electronic device 10 may contain wireless communications circuitry that is susceptible to radio-frequency interference. Device 10 may also contain circuits such as communications bus circuits, input-output interface circuits, and other device components that can potentially generate radio-frequency interference signals. To ensure satisfactory operation of device 10, circuit adjustments may be made in real time to mitigate the impact of interference. In particular, drivers or other circuitry may be adjusted so as to minimize common-mode noise. These adjustments may be made based on the current operating state of electronic device 10, so that optimum operating settings may be used under a variety of circumstances.

Device 10 may be a handheld electronic device such as a cellular telephone, media player, gaming device, or other device, may be a laptop computer, tablet computer, or other portable computer, may be a desktop computer, may be a television or set top box, or may be other electronic equipment. As shown in the example of FIG. 1, device 10 may have a housing such as housing 12. Housing 12 may be formed from plastic, metal, fiber composites such as carbon fiber, glass, ceramic, other materials, and combinations of these materials. Housing 12 may be formed using a unibody construction in which some or all of housing 12 is formed from an integrated piece of material or may be formed from frame structures, housing walls, and other components that are attached to each other using fasteners, adhesive, and other attachment mechanisms.

Device 10 may have input-output devices such as track pad 18 and keyboard 16. Camera 26 may be used to gather image data. Device 10 may also have components such as microphones, speakers, buttons, removable storage drives, status indicator lights, sensors, and other input-output devices. These devices may be used to gather input for device 10 and may be used to supply a user of device 10 with output. Ports in device 10 such as ports 28 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electronic ink display, or a display implemented using other display technologies. A touch sensor may be incorporated into display 14 (i.e., display 14 may be a touch screen display). Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from upper housing 12A and lower housing 12B. Upper housing 12A may include display 14 and may sometimes be referred to as a display housing or lid. Lower housing 12B may sometimes be referred to as a base or main housing. Housings 12A and 12B may be connected to each other using a hinge (e.g., hinge structures located in region 20 along the upper edge of lower housing 12B and the lower edge of upper housing 12A). The hinge may allow upper housing 12A to rotate about axis 22 in directions 24 relative to lower housing 12B. The plane of upper housing 12A and the plane of lower housing 12B may be separated by an angle A, as shown in FIG. 1. When lid 12A is closed (i.e., when lid 12A is lowered so as to rest flat against lower housing 12B), the value of A will be 0°. When lid 12A is perpendicular to lower housing 12B, the value of A will be 90°. The value of angle A may have other values in other configurations (i.e., values of 0-90° or values of more than 90°).

To support wireless communications, device 10 may have wireless circuitry including wireless transceiver circuitry and one or more antennas. The wireless communications circuitry may be used to support wireless communications in one or more wireless communications bands such as cellular telephone bands, satellite navigation bands, and local wireless area network bands (e.g., 2.4 GHz and 5 GHz to support IEEE 802.11 WLAN communications or 2.4 GHz to support Bluetooth® communications). Other wireless communications bands such as cellular telephone bands may also be supported.

The antennas that are associated with the wireless communications circuitry may be based on antenna structures such as patch antennas, monopole antenna structures, dipoles, loop antennas, closed slot antennas, open slot antennas, planar inverted-F antennas, inverted-F antennas, hybrid antennas that include more than one antennas of these types, and other antenna structures.

Figure 2:
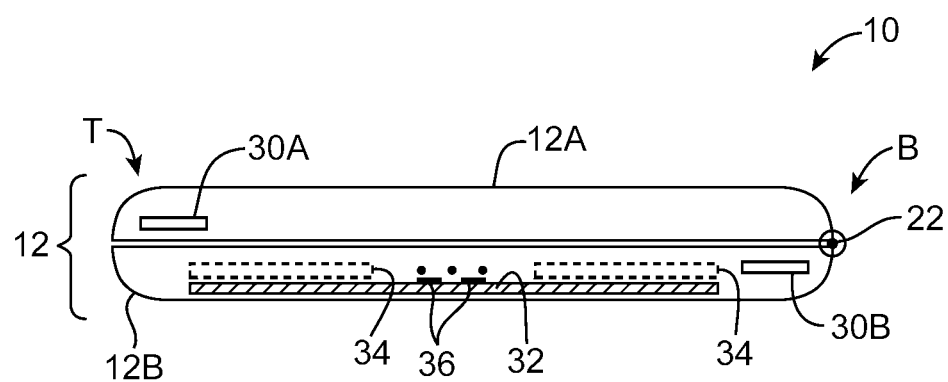
FIG. 2 is a side view of an electronic device of the type shown in FIG. 1 in a closed-lid (clamshell) configuration in accordance with an embodiment of the present invention.

Antennas may be mounted in device 10 at locations such as in the hinge ("clutch barrel") structures of housing 12, along the upper edge of display 12 (e.g., under the upper bezel of housing 12A), in lower housing 12B, under dielectric window structures in housing 12A or housing 12B, behind layers of glass or other dielectrics, or elsewhere in housing 12. An illustrative arrangement in which device 10 has two antennas is shown in FIG. 2. As shown in FIG. 2, device 12 may have a first antenna such as antenna 30A that is mounted within top edge T of upper housing 12A and a second antenna such as antenna 30B that is located within bottom edge B of lower housing 12B. Additional antennas (or fewer antennas) may be included in device 10 if desired. The arrangement of FIG. 2 is merely illustrative.

Device 10 may contain internal components such as components 34. Components 34 may include integrated circuits, discrete components (e.g., capacitors, resistors, and inductors), switches, connectors such as connectors for input-output ports and connectors for connecting internal device components, batteries, light-emitting diodes, sensors, etc. Components 34 may be interconnected using communications paths such as data buses. Data buses and other paths may be formed from conductive paths such as traces 36 on substrates such as substrate 32. Substrates that may be used within housing 12 of device 10 include printed circuit board substrates, glass substrates, plastic substrates, etc. Printed circuit substrates may include rigid printed circuit board substrates such as fiberglass-filled epoxy substrates (e.g., FR4), flexible printed circuit boards (e.g., printed circuits formed form one or more flexible polymer sheets such as sheets of polyimide), rigid flex (e.g., a board with both rigid and flexible portions), etc. Substrates and components such as substrate 32 and components 34 may be mounted in housing 12B, in housing 12A, in both housing 12A and 12B, or in other types of housing structures.

Antennas such as antennas 30A and 30B and associated transceiver circuitry may be susceptible to radio-frequency interference. Integrated circuits and other components within components 34 may also be sensitive to interference.

Some sources of interference are external to device 10. Other sources of potential interference are internal. For example, components 34 in device 10 may include circuits with drivers (sometimes referred to as output amplifiers or buffers) that have the potential to create radio-frequency interference. This radio-frequency interference may be carried through traces on substrate 32 or other current paths. Radio-frequency interference may also be conveyed wirelessly.

Components 34 may contain integrated circuits with drivers that drive signals onto digital buses, input-output ports, and other communications paths. In a typical computer environment, drivers may, for example, drive signals onto the conductive lines in a Peripheral Component Interconnect Express (PCIe) bus.

The drivers used in device 10 may include single-ended drivers (i.e., drivers in which signals are referenced to ground) and differential drivers (i.e., drivers in which a pair of signals are referenced to each other). Differential signal drivers may drive differential signals onto differential signal paths (e.g., a path such as a path formed from a pair of associated traces in a bus, a path formed from a pair of cable wires, etc.). Differential drivers such as the drivers that are used in driving signals onto a PCIe bus tend to be suitable for use with low-voltage circuits and may offer good immunity to electromagnetic interference.

Differential signaling schemes can, however, give rise to radio-frequency noise. A driver such as a differential driver for driving signals onto a PCIe bus or for driving signals in an output interface such as a display port may produce non-negligible amounts of common mode noise. When signals are driven onto a bus or other communications path at high speeds, the common mode noise may give rise to radio-frequency interference. The radio-frequency interference may spread across a fairly broad frequency range.

Wireless circuits and other internal components in device 10 may pick up the radio-frequency noise signals that are generated in this way. If care is not taken, device performance may be adversely affected.

Figure 3:
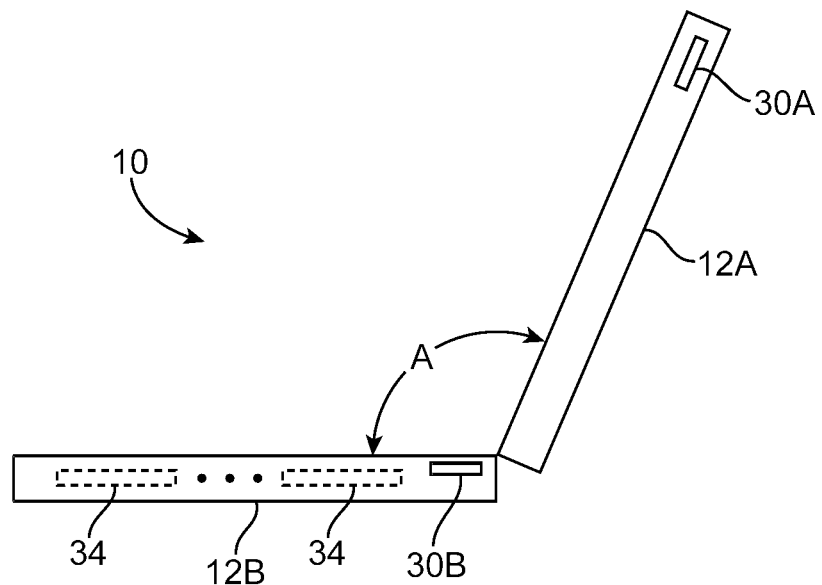
FIG. 3 is a side view of an electronic device of the type shown in FIG. 1 in an open-lid configuration in accordance with an embodiment of the present invention.

The impact of radio-frequency interference on the operation of device 10 may depend on a number of factors related to the current state of device 10. For example, the physical configuration of device 10 may affect the amount of coupling between a noise source and a sensitive circuit. An antenna such as antenna 30A may be particularly susceptible to interference from one of components 34 when upper housing 12A and lower housing 12B rest adjacent to each other (i.e., when the lid of device 10 is closed), as shown in FIG. 2. When the lid of device 10 is opened, as shown in FIG. 3, the physical separation between antenna 30A and components 34 may be increased and the potential for interference from one of components 34 adversely affecting antenna 30A may be reduced. Different levels of interference may be exhibited for each angle A of lid 12A with respect to base 12B. The position of lid 12A may also affect the amount of interference that is experienced between other components (i.e., between a circuit with interference-producing output drivers and a sensitive circuit on a printed circuit board).

Interference effects may have varying degrees of severity depending on the signal frequencies in question. At some frequencies (i.e., signal frequencies that are far away from the frequencies being used by a sensitive circuit), the impact of the interference may be weak or negligible. At other frequencies (i.e., signal frequencies that coincide with the signal frequencies normally used by a sensitive circuit), interference may be more pronounced. As an example, a wireless circuit may operate in one or more communications bands. Interference that falls within a first communications band such as a WiFi® (IEEE 802.11) band at 2.4 GHz, but not a second band such as a WiFi® (IEEE 802.11) band at 5 GHz will primarily be of significance when device 10 is operated in the first band. Frequency-dependent interference effects such as these may also manifest themselves at a more granular level. For example, a given interference source may affect one wireless channel such as WiFi® (IEEE 802.11) channel 11 more than another wireless channel such as WiFi® (IEEE 802.11) channel 12. Effects such as these may arise in IEEE 802.11 (WiFi®) networks or other wireless local area networks.

Yet another aspect of the state of device 10 that affects the impact of interference is whether or not a particular sensitive component is in use (i.e., whether or not wireless circuitry in device 10 is enabled) and whether or not a particular interference-generating circuit is in use (i.e., whether drivers are being used to drive signals onto a PCIe bus or through an output interface). When a sensitive circuit is not being used or when an interference circuit is temporarily disabled, interference may be of little or no concern.

There may also be other factors that affect the impact of interference on device performance and there may be an interplay between these factors (e.g., interference may be greatest for one wireless band when lid 12A is closed and may be greatest for another wireless band when lid 12A is open, etc.). To optimize performance of device 10, the state of device 10 may be monitored in real time and appropriate actions taken based on predetermined optimized operating settings.

Examples of information that may be gathered on the state of device 10 includes the status of lid 12A such as angle A, the status of the wireless circuitry in device 10 such as the active/inactive status of various wireless bands and/or channels, information on the type of software being run by device 10, the identity of the active and inactive output interfaces (e.g., input-output ports for displays and other peripherals) in device 10, the status of components such as graphics cards, storage subsystems, power management features, processors and other device components, and other information on the physical and electrical operating characteristics of device 10. In general, any operating characteristic of device 10 that may affect interference may be monitored.

Figure 4:
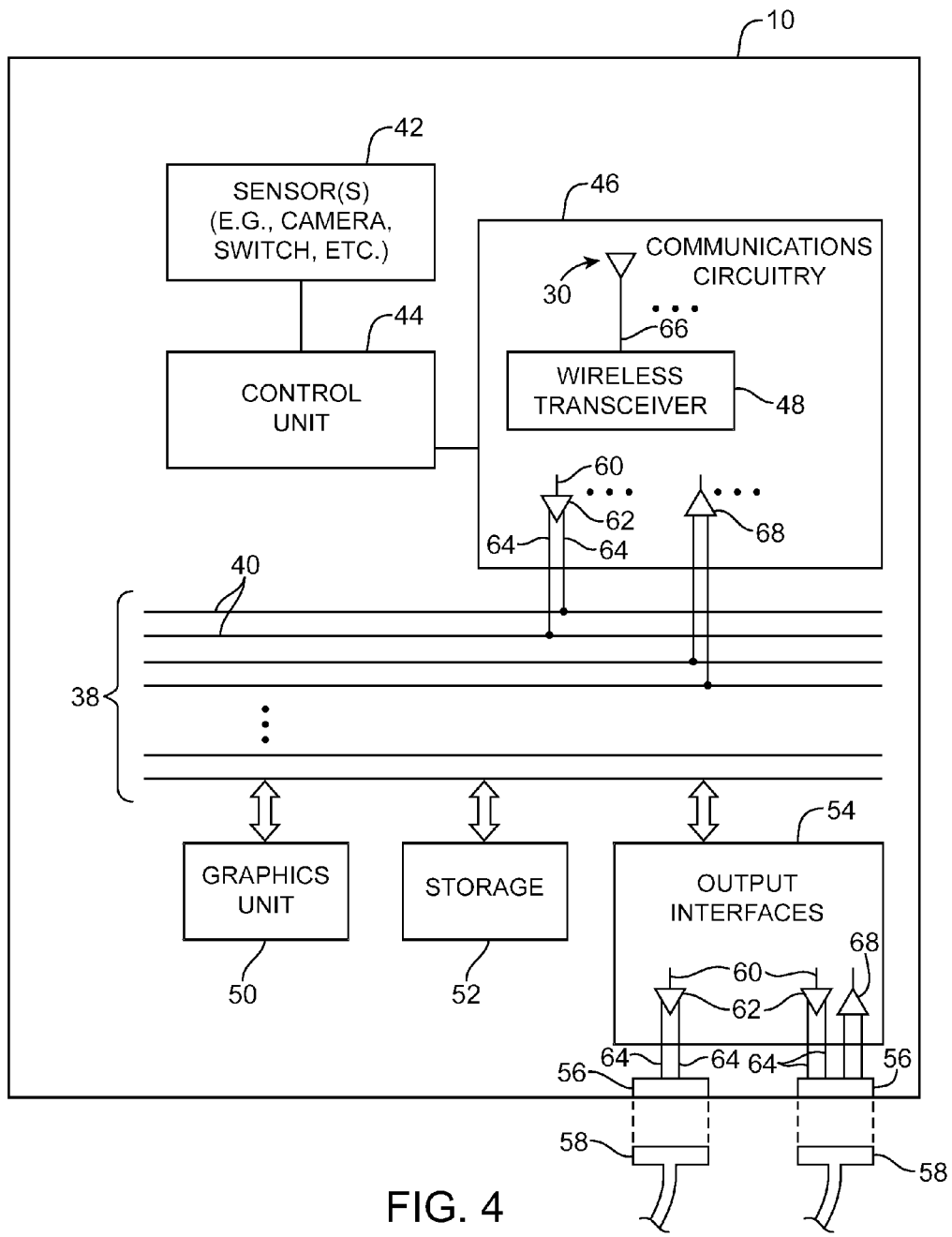
FIG. 4 is a circuit diagram of an illustrative electronic device in accordance with an embodiment of the present invention.
Figure 5:
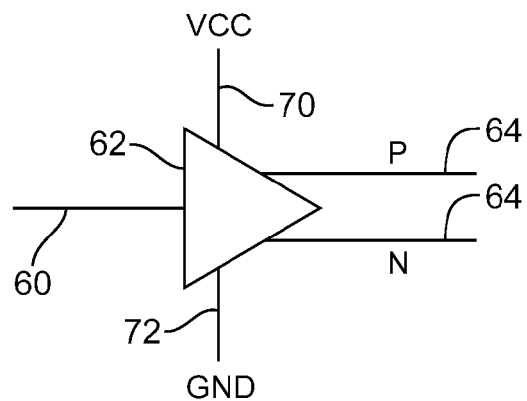
FIG. 5 is a circuit diagram of an illustrative driver that may be used to drive data signals onto a differential communications path in accordance with an embodiment of the present invention.

Information on the state of device 10 may be gathered by sensors, processors, and other components and circuitry in device 10. FIG. 4 is a circuit diagram showing an illustrative configuration that may be used for device 10. As shown in FIG. 4, device 10 may include communications paths. Examples of communications paths that may be present in device 10 include bus 38 and its associated conductive lines 40 and the communications paths between output interfaces 54 and associated connectors 56. Bus 38 may be a PCIe bus or other bus. Components such as communications circuitry 46, graphics unit 50, storage 52, and input-output interfaces 54 may be coupled to bus 38 and other such buses in device 10. Interfaces 54 may include circuitry for transmitting and receiving signals for computer monitors, televisions, and other displays and other external components. As shown in FIG. 5, interfaces 54 may be coupled to connectors 56. Each connector 56 may receive a mating connector 58 such as a plug associated with an external cable. Connectors 56 and 58 may be associated with input-output ports such as ports for external displays and other peripherals.

As shown in FIG. 4, device 10 may include control circuitry 44. Control circuitry 44 may include storage such as flash memory, hard disk drive memory, solid state storage devices, other nonvolatile memory, random-access memory and other volatile memory, etc. Control circuitry 44 may also include processing circuitry. The processing circuitry of control circuitry 44 may include digital signal processors, microcontrollers, application specific integrated circuits, microprocessors, power management unit (PMU) circuits, and processing circuitry that is part of other types of integrated circuits. The components of device 10 in FIG. 4 need not be mutually exclusive. For example, storage 52 may include memory circuits that are part of control circuitry 44 and control circuitry 44 may contain processing circuits that are part of other components.

Sensors such as sensors 42 may be used to gather input on the state of device 10. Sensors 42 may include cameras such as camera 26 of FIG. 1 (e.g., to detect the position of lid 12A relative to base 12B or other information on the operating state of device 10), switches (e.g., switches that are used to implement a position sensor that detects when lid 12A is open or closed, switches that implement a position sensor that measures angle A, etc.), other sensors that can measure the position of lid 12A (e.g., motion sensors, accelerometers, touch sensors, proximity sensors, electromagnetic sensors, etc.), and other sensing electronics.

Communications circuitry 46 may include circuitry for interfacing with control unit 44. Communications circuitry 46 may also include wireless communications circuitry such as wireless radio-frequency transceiver 48 and antenna structures 30. Wireless transceiver 48 may transmit and receive radio-frequency signals from device 10 using antenna structures 30. Circuitry 48 may be used to handle one or more communications bands. Examples of communications bands that may be handled by circuitry 48 include cellular telephone bands, satellite navigation bands (e.g., the Global Positioning System band at 1575 MHz), bands for short range links such as the Bluetooth® band at 2.4 GHz and wireless local area network (WLAN) bands such as the IEEE 802.11 band at 2.4 GHz and the IEEE 802.11 band at 5 GHz, etc.

Paths such as path 66 may include one or more radio-frequency transmission lines. Transmission lines in path 66 may include coaxial cable paths, microstrip transmission lines, stripline transmission lines, edge-coupled microstrip transmission lines, edge-coupled stripline transmission lines, transmission lines formed from combinations of transmission lines of these types, etc.

Transmission line path 66 may be used to couple radio-frequency transceiver circuitry 48 to one or more antennas 30. Antenna structures in antennas 30 may receive incoming radio-frequency signals (including potential interference) that are routed to radio-frequency transceiver circuitry 48 by path 66. During signal transmission operations, radio-frequency transceiver circuitry 48 may transmit radio-frequency signals that are conveyed by path 66 to antenna structures 30 and transmitted to remote receivers.

Communications circuitry 46 may also contain non-wireless communications circuitry such as circuits that form an interface with buses such as bus 38.

Graphics unit 50 may be implemented using a discrete graphics component (e.g., an add-on graphics card), an integrated graphics adapter (e.g., a graphics circuit that is part of a microprocessor or microprocessor chipset), or other graphics circuitry.

Storage 52 may include hard drives, solid state drives, volatile memory, non-volatile memory, drives for handling optical disks and other removable storage media, etc.

Interfaces 54 may be used to convey data from device 10 to computer monitors and other peripherals and may be used to receive data from external components.

Components such as communications circuitry 46, graphics unit 50, storage 52, and interfaces 54 may be coupled to communications paths such as bus 38. Interfaces 54 may also be coupled to communications paths between interfaces 54 and ports 56. Output drivers may be used to drive signals onto communications paths and input drivers may be used to receive signals from communications paths. As an example, communications circuitry 46 may have input drivers such as input drivers 68 that receive signals from bus 38. Interfaces 54 may also have input drivers 68. Output drivers 62 in components such as communications circuitry 46, interfaces 54, and other components in device (e.g., graphics unit 50, storage 52, etc.) may be used to drive signals onto communications paths. For example, output drivers 62 in circuitry 46 may drive differential output signals onto lines 40 in bus 38 via lines 64 and output drivers 62 in interfaces 54 may drive differential output signals onto the output paths associated with ports 56 and connectors 58 and onto bus 38.

Internal signals such as the signals at the outputs of integrated circuit input drivers tend not to radiate radio-frequency signals. Radio-frequency interference is generally more likely to be generated during the process of driving signals onto a more exposed communications path such as bus 38 or the paths associated with output ports 56. To minimize the impact of this type of radio-frequency interference, the behavior of output drivers 62 and wireless circuits or other sensitive circuits that are subject to potential interference can be characterized over a range of potential operating conditions. Optimum device settings may then be computed and used during operation of device 10 to ensure that radio-frequency interference is minimized in various device states.

In general, any suitable device setting that affects the amount of interference that is conveyed between an interference source in device 10 and a sensitive device component may be characterized. For example, the impact of various drive strength settings may be characterized under various different lid configurations and wireless operating frequencies. During device manufacturing or at other suitable times, the optimum operating settings for device 10 may be loaded into device 10 (e.g., into storage 52 of FIG. 4). When operating device 10, control unit 44 can gather information on the current state of device 10 (e.g., information on which wireless frequencies are in use from wireless communications circuitry in circuitry 46, information on the status of lid 12A from sensors 42, etc.). Based on the known operating state of device 10 and the predetermined optimum operating settings stored in storage 52, control circuitry 44 can determine how to adjust the operation of device 10 to minimize interference. For example, the strength of various output drivers 62 may be adjusted appropriately.

The strength of drivers 62 may be controlled by using control unit 44 to adjust the bias voltages that are applied to the drivers. FIG. 5 is a circuit diagram showing how a typical output driver is biased. As shown in FIG. 5, driver 62 may have an input 60 and an output 64. Input 60 may be, for example, a single-ended input that receives digital data from circuitry in communications circuitry 46, output interfaces 54, or other components in device 10. Output 64 may have a pair of terminals that are coupled to a pair of associated conductive lines. These lines may form a differential pair that conveys signals to bus 38, an output path associated with ports 56, etc. A first of the lines coupled to the differential output of driver 62 may carry a signal p and a second of the lines coupled to the differential output of driver 62 may carry a complementary signal n.

Each driver 62 may be powered by power supply terminals such as positive power supply terminal 70 and ground power supply terminal 72. Positive power supply terminal 70 may receive a positive power supply voltage such as Vcc (e.g., 0.7 volts to 1.1 volts or other suitable voltage levels). Ground terminal 72 may receive a ground power supply voltage GND such as 0 volts. Configurations with other types of voltage biasing may be used if desired (e.g., negative or positive grounds, negative supplies, etc.). The biasing configuration of FIG. 5 is merely illustrative.

Figure 6:
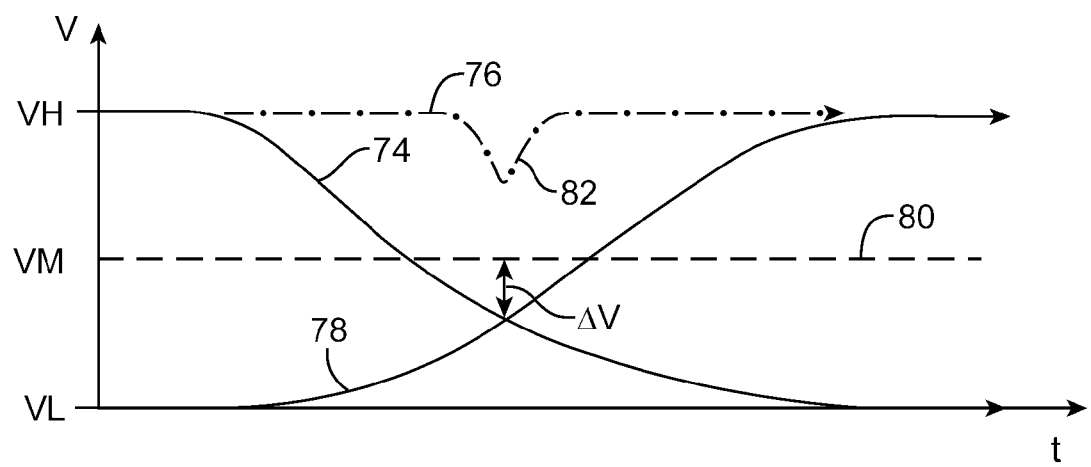
FIG. 6 is a diagram showing how a driver circuit of the type shown in FIG. 5 may produce common mode noise under certain voltage bias conditions that can lead to radio-frequency interference in an electronic device with wireless communications circuitry in accordance with an embodiment of the present invention.

FIG. 6 is a graph showing illustrative differential output signals that may be produced on output 64 of output driver 62 of FIG. 5. As shown in FIG. 6, the positive signal p may be characterized by a curve such as line 74 and the negative signal n may be characterized by a curve such as curve 78. During data transmission operations, these curves nominally will cross at an intermediate voltage level VM (i.e., a voltage that lies midway between upper voltage VH and lower voltage VL and is equal to VH/2 when VL is equal to a ground voltage GND of 0 volts). The value of intermediate voltage VM relative to curves 74 and 78 at the time at which curves 74 and 78 cross each other is illustrated by dashed line 80 and voltage difference $\Delta V$.

The circuit components such as the metal-oxide-semiconductor transistors or other transistors that make up drivers 62 exhibit non-ideal behavior. This can lead to signal crossings between lines 74 and 78 that are not perfectly aligned with intermediate voltage VM (i.e., non-zero values of $\Delta V$). As a result, the common mode signal (line 76) associated with the output of driver 62 may exhibit pulses such as pulse 82 (i.e., common mode noise that serves as a source of interference). When the data rate of the output signals from driver 62 is sufficiently high (e.g., 10s or 100s of MHz or more), the fundamental and signal harmonics associated with the common mode noise can give rise to radio-frequency interference.

The non-ideal behavior of drivers 62 is generally not constant as a function of biasing conditions. Drivers 62 may, for example, exhibit more noise when powered at a first value of Vcc, while exhibiting less noise when powered at a second value of Vcc. At other biasing levels (i.e., when using different magnitudes of Vcc and/or GND in FIG. 5), yet other amounts of noise may be produced. The noise that is produce may have frequency components that vary as a function of bias level. Noise characteristics may also vary depending on driver location and driver type.

Figure 7:
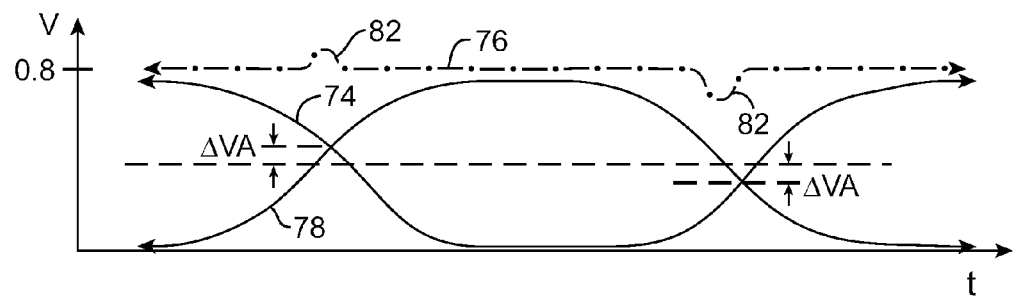
FIG. 7 is a graph showing the illustrative output of a driver when biased with a power supply voltage of 0.8 volts in accordance with an embodiment of the present invention.
Figure 8:
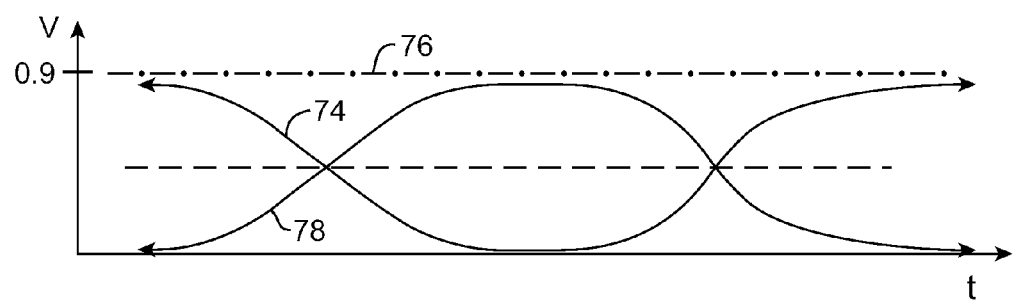
FIG. 8 is a graph showing the illustrative output of a driver when biased with a power supply voltage of 0.9 volts in accordance with an embodiment of the present invention.
Figure 9:
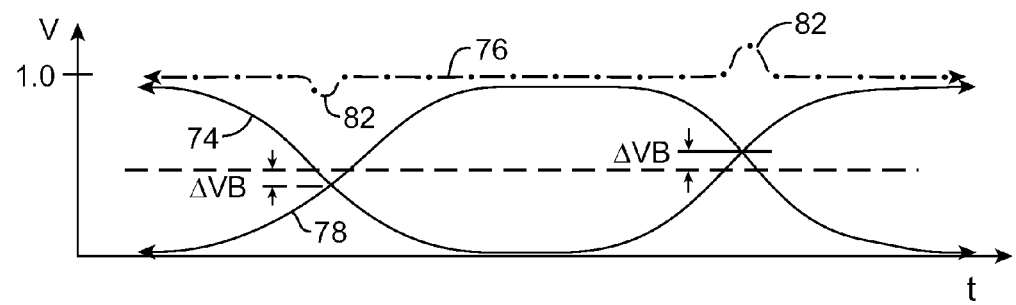
FIG. 9 is a graph showing the illustrative output of a driver when biased with a power supply voltage of 1.0 volts in accordance with an embodiment of the present invention.

An example is shown in FIGS. 7, 8, and 9. In the configuration of FIG. 7, driver 62 is being powered at a positive power supply value Vcc of 0.8 volts, so the peak-to-peak voltage at the output of driver 62 is 0.8 volts. Under these biasing conditions, there may be voltage offsets of $\Delta VA$ that give rise to noise pulses 82 of a first magnitude.

In the configuration of FIG. 8, drive strength has been increased relative to the configuration of FIG. 7. Driver 62 is being powered at a positive power supply voltage Vcc of 0.9 volts, so the peak-to-peak voltage at the output of driver 62 is about 0.9 volts. When biased in this way, noise pulses 82 may have a second magnitude. In particular, there may be minimal voltage offsets where signal curves 74 and 78 cross, leading to negligible common mode noise (i.e., no significant pulses 82).

In the configuration of FIG. 9, drive strength has been increased relative to the configuration of FIG. 8. In particular, driver 62 is being biased at a Vcc level of 1.0 volts and a ground value GND of 0 volts. The peak-to-peak voltage associated with differential signal curves 74 and 78 is therefore 1.0 volts. In the FIG. 9 example, this leads to voltage offsets of $\Delta VB$ where curves 74 and 78 cross and produces common mode noise pulses 82 of a third magnitude (e.g., a magnitude that is potentially different than the first and second magnitudes).

In the example of FIGS. 7, 8, and 9, illustrative Vcc levels of 0.8, 0.9, and 1.0 were used as examples. A typical driver can be biased at other levels (e.g., any level within a voltage range of 0.7 to 1.1 volts, any level within other suitable voltage ranges, etc.). Moreover, the relationship between drive strength (bias voltage) and noise that is illustrated in FIGS. 7, 8, and 9 is merely illustrative. For example, noise may monotonically increase with increasing bias voltage, noise may monotonically decrease with increasing bias voltage, noise may increase and then decrease as a function of increasing bias voltage (e.g., exhibiting a local noise maximum), noise may decrease and then increase as a function of increasing bias voltage (e.g., exhibiting a local noise minimum), noise may increase and decrease multiple times (e.g., exhibiting multiple minima and/or maxima), etc.

Noise characteristics are also generally dependent on other factors involved in the operation of device 10. For example, the way in which noise increases and/or decreases as a function of increasing bias voltage may, in general, be different for different signal frequencies. The dependence of noise on bias voltage may be different in different communications bands (e.g., in bands such as the WiFi® bands at 2.4 GHz and 5 GHz, the Bluetooth® band at 2.4 GHz, etc.) and/or in different communications channels within each communications band that is being used. Other factors that may influence the impact of noise in device 10 include the location of the drivers that are producing the noise, the location of the antenna or other system that is being affected by the noise, the settings of the wireless circuitry that is being affected (e.g., which communications protocol or which communications protocol settings are in use, gain settings, the number of antennas in use, data rate settings, etc.), the state of the lid of device 10, etc.

Some or all of these factors can be taken into consideration during device characterization operations. After the impact of noise has been characterized under a variety of conditions, optimum device settings can be determined and stored in device 10. Device 10 can then use these optimum settings to ensure that the impact of driver noise is minimized during device operation.

A table showing how noise may vary as a function of factors such as drive strength, lid position, and wireless frequency (e.g., WiFi® band and/or channel). Data of the type shown in the table of FIG. 10 and other suitable information on the way in which noise varies within device 10 as a function of drive strength may be stored in tables or other suitable data structures (e.g., in a database). This data may be analyzed to determine optimum device settings to minimize noise during normal device operation.

Figure 11:
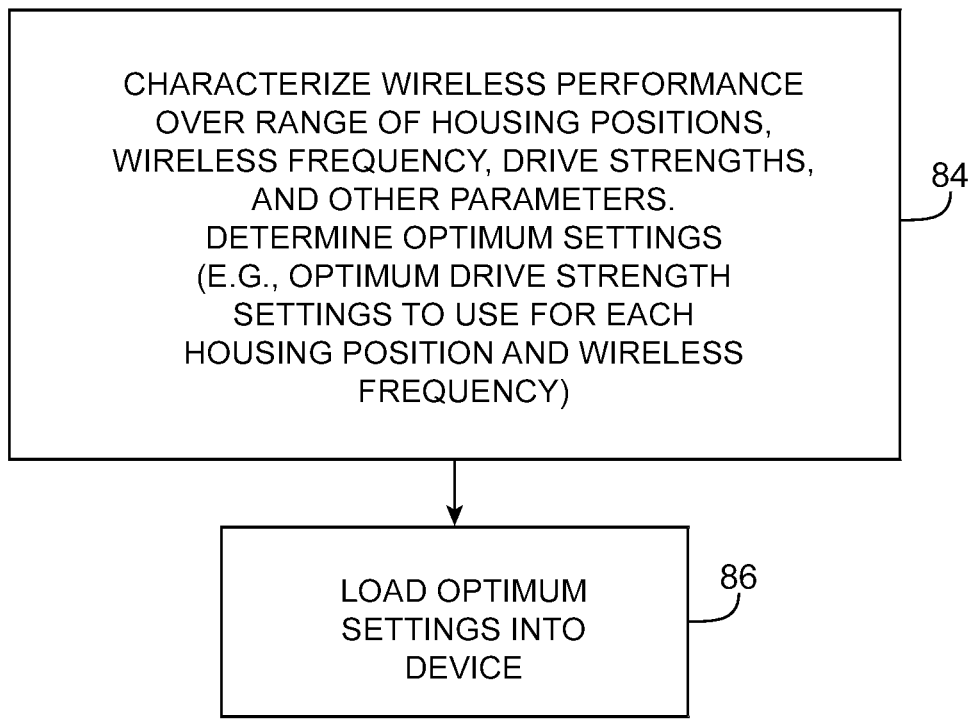
FIG. 11 is a flow chart of illustrative steps involved in determining optimum device operating settings to use to mitigate the impact of possible radio-frequency interference during device operation under various operating conditions in accordance with an embodiment of the present invention.

Illustrative steps involved in characterizing radio-frequency noise in device 10 to determine optimum settings for mitigating the impact of radio-frequency noise on the operation of wireless circuitry or other sensitive circuitry in device 10 are shown in FIG. 11.

At step 84, a test version of device 10 may be characterized. The test version of device 10, which may sometimes be referred to as a device under test (DUT), may be used to run a test program that gathers information internally. External test equipment may also be used to measure performance of the DUT. The DUT may be operated under a range of different operating conditions to characterize the amount of noise that is produced and the susceptibility of the sensitive components in the DUT to the noise that is produced. During device characterization operations, the internal test software and the external test equipment may direct the DUT to change settings (e.g., to systematically step through various ranges of driver bias levels such as voltages from 0.7 volts to 1.1 volts in suitable voltage increments) while systematically varying other parameters such as which wireless channel is active, the position of lid 12A, the identity of the transmitting driver, the state of output interfaces 54 and other components, etc. While these operating parameters are systematically changed, the resulting impact of radio-frequency noise that the drivers (or other noise sources) in device 10 generate may be monitored. For example, the test software running in the DUT and/or the external test equipment may be used to gather information on performance metrics such a wireless channel bit error rate, or other performance information that is representative of the impact of interference from the radio-frequency noise.

After sufficient characterizing data has been gathered, the data may be analyzed. For example, computing equipment associated with the external test equipment, computing equipment associated with the DUT, and/or other computing equipment may be used to perform curve-fitting operations and other data analysis operations that identify data trends, minima and maxima, etc. The results of the data analysis may be used to identify optimum drive strength settings (i.e., driver voltage power supply levels) to use to minimize the impact of radio-frequency interference produced by the drivers in device 10 under a variety of operating conditions.

At step 86, the optimum settings to be used (e.g., the driver bias levels to be used) for each anticipated pattern of operating parameters may be loaded into devices 10. Optimum settings may be loaded into devices 10 during manufacturing, during a firmware update process, etc. The optimum settings may be stored in storage in device 10 (e.g., in storage 52 of FIG. 4).

Figure 12:
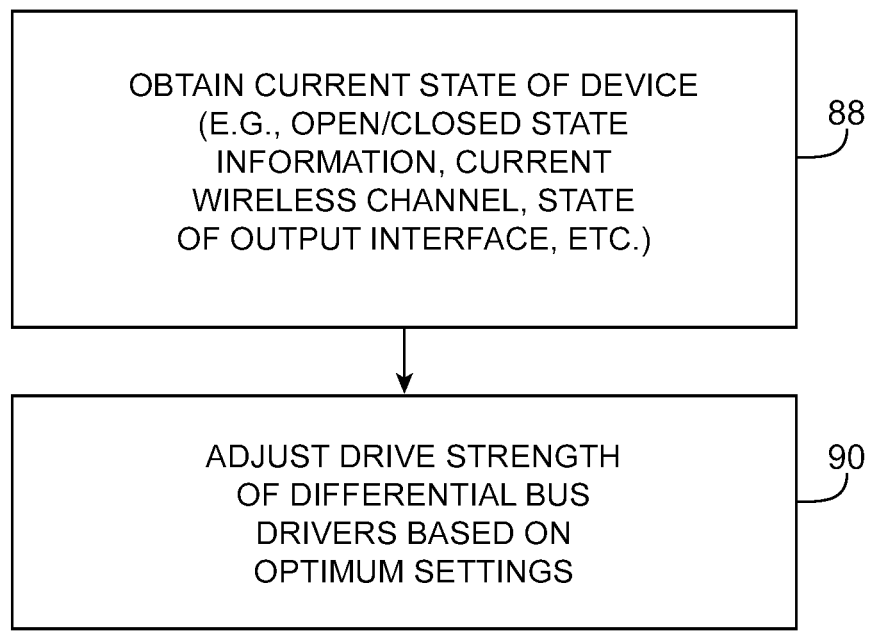
FIG. 12 is a flow chart of illustrative steps involved in determining the operating state of an electronic device by monitoring operating parameters in real time and in adjusting device operation to mitigate the impact of possible radio-frequency interference in accordance with an embodiment of the present invention.

The flow chart of FIG. 12 shows illustrative steps involved in operating a device that has been loaded with the optimum settings of step 86.

At step 88, device 10 may be operated by a user. During device operation, control unit 44 may obtain information on the current operating state of device 10. For example, control unit 44 may obtain information on the position of lid 12A from sensors 42. Sensors 42 may include a switch that indicates whether lid 12A is open or closed, may include a position sensor that provides information on angle A, may include a camera that captures images that can be processed to determine the status of lid 12A, may include ambient light sensors, proximity sensors, or other sensors to determine information on the status of lid 12A and/or other device status information. Control unit 44 can also obtain information about the status of wireless circuitry such as which WiFi® band and channel is being used, which antenna 30 is are being used, etc. Information on whether graphics unit 50, storage 52, and output interfaces 54 are being used or have been turned off or otherwise deactivated may also be gathered by control unit 44. Control unit 44 may obtain information on which circuits are being used and how each circuit is being used in device 10 by interacting with applications running on device 10, by interacting with operating system functions that are operating on device 10, by interacting with device drivers, by polling hardware in device 10 for status information, etc.

At step 90, after device 10 has used control unit 44 to gather information on the operating state of device 10, device 10 may use control unit 44 to make adjustments to the circuitry of device 10 that minimize the impact of radio-frequency interference in that operating state. The adjustments that are made may include, for example, adjustments to the power supply voltages for drivers 62. The changes that are made may depend on device state information such as whether lid 12A is open or closed (because wireless circuitry may be more sensitive to interference when lid 12A is closed and antennas such as antenna 30A in lid 12A have been placed in a location that is near to PCIe bus 38 or other location that contains noise), which drivers 62 are being used (e.g., whether the drivers in output interface 54 are active, whether the drivers in circuitry 46 that drive signals onto PCIe bus 38 are active, etc., which wireless frequency is currently being used by wireless transceiver 48, whether graphics unit 50, storage 52, and other circuits are being used, etc.

Control unit 44 preferably makes changes to the drive strengths of drivers 62 that are based on the optimum settings produced during the operations of step 86. For example, if the optimum settings stored in device 10 indicate that interference with wireless communications in channel 11 can be minimized by setting the driver bias level (strength) to 0.9 volts when operating device 10 with lid 12A open, control circuitry 44 may apply this driver bias level during the operations of step 90. In response to detecting a change in the status of an operating parameter, control circuitry 44 may make real time adjustments to the operation of device 10. For example, if a user closes lid 12A and/or changes to a different wireless channel, control circuitry 44 can consult the optimum settings stored in storage 52 to determine whether the driver bias level should be maintained at its current setting or should be updated.

The foregoing is merely illustrative of the principles of this invention and various modifications can be made by those skilled in the art without departing from the scope and spirit of the invention.

What is claimed is:

1. An electronic device that has a current operating state that comprises a relative position between housing structures in the electronic device, comprising:
   drivers that drive signals onto communications lines;
   control circuitry that powers the drivers at a driver bias voltage level;
   wireless circuitry that is subject to potential interference from radio-frequency noise produced by the drivers; and
   control circuitry that adjusts the driver bias voltage level as a function of the current operating state to minimize interference at the wireless circuitry from the radio-frequency noise.

2. The electronic device defined in claim 1 further comprising storage that stores optimum settings for the drivers, wherein the control circuitry is configured to adjust the driver bias voltage level based on the optimum settings.

3. The electronic device defined in claim 1 wherein the device has a first housing structure and a second housing structure that are attached by hinge structures so that the first housing structure has a position that is adjustable relative to the second housing structure and wherein the control circuitry is configured to adjust the driver bias voltage level based at least partly on the position.

4. The electronic device defined in claim 3 wherein the wireless circuitry is operable in a plurality of wireless communications bands and wherein the control circuitry is configured to adjust the driver bias voltage level based at least partly on which of the plurality of wireless communications bands is currently being used by the wireless circuitry.

5. The electronic device defined in claim 3 wherein the wireless circuitry is operable in a plurality of wireless communications bands including 2.4 GHz and 5 GHz wireless local area network bands and wherein the control circuitry is configured to adjust the driver bias voltage level based at least partly on which of the plurality of wireless communications bands is currently being used by the wireless circuitry.

6. The electronic device defined in claim 3 wherein the wireless circuitry is operable in a plurality of wireless communications channels and wherein the control circuitry is configured to adjust the driver bias voltage level based at least partly on which of the plurality of wireless communications channels is currently being used by the wireless circuitry.

7. The electronic device defined in claim 3 wherein the wireless circuitry is operable in a plurality of IEEE 802.11 wireless channels and wherein the control circuitry is configured to adjust the driver bias voltage level based at least partly on which of the plurality of wireless channels is currently being used by the wireless circuitry.

8. The electronic device defined in claim 1 wherein the electronic device has a first housing structure and a second housing structure that are attached by hinge structures so that the first housing structure has a position that is adjustable relative to the second housing structure, wherein the electronic device further comprises a position sensor that senses the position of the first housing structure relative to the second housing structure, and wherein the control circuitry is configured to adjust the driver bias voltage level based at least partly on the sensed position.

9. The electronic device defined in claim 1 wherein the wireless circuitry is operable in a plurality of wireless communications bands and wherein the control circuitry is configured to adjust the driver bias voltage level based at least partly on which of the plurality of wireless communications bands is currently being used by the wireless circuitry.

10. The electronic device defined in claim 9 wherein the communications lines form part of a digital communications bus and wherein the drivers comprise differential drivers.

11. The electronic device defined in claim 10 wherein the communications bus comprises a Peripheral Component Interconnect Express bus.

12. The electronic device defined in claim 1 wherein the wireless circuitry is operable in a plurality of wireless local area network communications channels and wherein the control circuitry is configured to adjust the driver bias voltage level based at least partly on which of the plurality of wireless local area network communications channels is currently being used by the wireless circuitry.

13. The electronic device defined in claim 1 wherein the communications lines form part of a digital communications bus and wherein the drivers comprise differential drivers.

14. The electronic device defined in claim 13 wherein the communications bus comprises a Peripheral Component Interconnect Express bus.

15. A method of operating an electronic device that has a current operating state and that comprises wireless communications circuitry, comprising:

with control circuitry in the electronic device, obtaining information on the current operating state of the electronic device; and based at least partly on the current operating state obtained by the control circuitry, adjusting driver bias voltages that power signal drivers within the electronic device to minimize interference from radio-frequency noise produced by the signal drivers in the electronic device; and wherein the wireless communications circuitry is subject to the interference from the radio-frequency noise and is operable in a plurality of wireless communications bands, and adjusting the driver bias voltages comprises using information stored in the electronic device and information about which of the plurality of wireless communications bands is currently being used by the wireless circuitry to determine how to adjust the driver bias voltages.

16. The method defined in claim 15 wherein the electronic device comprises a portable computer with a lid having an adjustable position, wherein obtaining the information on the current operating state of the electronic device comprises determining the position of the lid, and wherein adjusting the driver bias voltages comprises selecting a driver bias voltage level for the signal drivers based at least partly on the position of the lid.

17. A portable computer, comprising:

control circuitry; wireless local area network circuitry operable in a plurality of wireless local area network bands;

a communications bus;

differential signal drivers that drive signals onto the communications bus and that are powered at a voltage bias level by the control circuitry, which is configured to adjust the voltage bias level in real time during operation of the portable computer to minimize interference with the wireless local area network circuitry due to radio-frequency noise produced by the differential signal drivers, and which is further configured to adjust the voltage bias levels based at least partly on which of the plurality of wireless local area network bands is in current use by the wireless local area network circuitry.

18. The portable computer defined in claim 17 further comprising:

at least one sensor, wherein the control circuitry is configured to gather sensor data from the sensor and is configured to adjust the voltage bias level based at least partly on the gathered sensor data.

19. The portable computer defined in claim 18 further comprising a lid, wherein the sensor comprises a lid position sensor that gathers information on whether the lid is open or closed.

20. The portable computer defined in claim 3 wherein the control circuitry is configured to adjust the driver bias voltage level based at least partly on the position of the first housing structure to minimize the interference at the wireless circuitry from the radio-frequency noise.

\* \* \* \* \*